United States Patent
Kersch et al.

(10) Patent No.: US 11,973,668 B2
(45) Date of Patent: Apr. 30, 2024

(54) CORRELATING NETWORK DATA WITH INSTANT APP FEEDBACK FOR ML-BASED CUSTOMER EXPERIENCE MANAGEMENT

(71) Applicant: Telefonaktiebolaget LM Ericsson (publ), Stockholm (SE)

(72) Inventors: Péter Kersch, Budapest (HU); Tamas Borsos, Budapest (HU); Zsófia Kallus, Budapest (HU); Peter Vaderna, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/017,764

(22) PCT Filed: Aug. 3, 2020

(86) PCT No.: PCT/IB2020/057344
§ 371 (c)(1),
(2) Date: Jan. 24, 2023

(87) PCT Pub. No.: WO2022/029465
PCT Pub. Date: Feb. 10, 2022

(65) Prior Publication Data
US 2023/0300039 A1    Sep. 21, 2023

(51) Int. Cl.
*H04L 41/5067*    (2022.01)
*H04L 41/0631*    (2022.01)
(Continued)

(52) U.S. Cl.
CPC ...... *H04L 41/5067* (2013.01); *H04L 41/0631* (2013.01); *H04L 41/16* (2013.01); *H04L 41/5074* (2013.01)

(58) Field of Classification Search
None
See application file for complete search history.

(56) References Cited

U.S. PATENT DOCUMENTS 9,558,451 B2    1/2017 Nilsson et al.
9,818,136 B1 *  11/2017 Hoffberg ............... G07F 17/323
(Continued)

FOREIGN PATENT DOCUMENTS

EP    2571195 A1    3/2013

OTHER PUBLICATIONS

Plakia et al., "On user-centric analysis and prediction of QoE for video streaming using empirical measurements", Jun. 1, 2016, IEEE, 2016 Eighth International Conference on Quality of Multimedia Experience (QoMEX) (pp. 1-6) (Year: 2016).*
(Continued)

*Primary Examiner* — Davoud A Zand
(74) *Attorney, Agent, or Firm* — COATS & BENNETT, PLLC (57) ABSTRACT

The correlation of per-session network logs with trouble reports provided by the users/user devices via a trouble reporting app generates labeled training information used to train Machine Learning (ML) models that are subsequently used to infer, explain, and address service issues associated with an application service session. As such, the level of automation for Quality of Experience (QoE) management increases, while the accuracy of such QoE management increases and a subscriber's experience improves.

20 Claims, 5 Drawing Sheets

(51) Int. Cl.
*H04L 41/16* (2022.01)
*H04L 41/5074* (2022.01)

(56) References Cited

U.S. PATENT DOCUMENTS

| 2017/0353991 | A1 | 12/2017 | Tapia |
| 2018/0039914 | A1 | 2/2018 | Menahem et al. |
| 2018/0182489 | A1* | 6/2018 | Härmä ................. G06F 9/546 |
| 2020/0029240 | A1 | 1/2020 | Li et al. |
| 2020/0293116 | A1* | 9/2020 | Udall ................. G06V 10/147 |

OTHER PUBLICATIONS

3rd Generation Partnership Project, "3rd Generation Partnership Project; Technical Specification Group Services and System Aspects; Management and orchestration; Study on enhancement of Management Data Analytics (MDA) (Release 17)", Technical Report, 3GPP TR 28.809 V0.4.0, Jun. 2020, pp. 1-49, 3GPP.

* cited by examiner

CORRELATING NETWORK DATA WITH INSTANT APP FEEDBACK FOR ML-BASED CUSTOMER EXPERIENCE MANAGEMENT

TECHNICAL FIELD

The solution presented herein relates generally to customer experience management in a wireless communication system, and more particularly to machine learning (ML) techniques that make use of direct user feedback for customer experience management.

BACKGROUND

Over-the-top (OTT) services typically include media services, e.g., video on demand, games, etc., provided to users via the internet via a wired or wireless connection. In general, OTT bypasses traditional providers of such content, e.g., cable, satellite, etc. As with any service, it is important for the service and network providers to have a clear understanding of the quality of the service they are providing, as well as customer satisfaction with the provided services.

Some OTT service providers have implemented easy ways for users to leave feedback about user experience. For example, WhatsApp or Facebook messenger may prompt the user for a simple 5-star rating after voice or video calls. In addition, when the OTT service provider owns both the client side (e.g., the app) and the server-side (e.g., the cloud) associated with the OTT service, the OTT service provider can objectively and automatically measure end-to-end Quality of Experience (QoE) metrics. By combining the automated QoE metrics with the user experience ratings, the OTT service provider can achieve a high level of automation for QoE management using machine learning (ML) models, e.g., automatically adapting technical parameters of a call to improve QoE, e.g., as demonstrated in U.S. Pat. No. 9,558,451 entitled "Adapting parameters of a call in Progress with a model that predicts call quality," and issued 31 Jan. 2017. Unfortunately, the star rating system often does not provide sufficiently specific user experience feedback. For example, when mobile network subscribers have user experience degradations for OTT services due to network problems, connectivity issues, etc., the star rating system does not provide sufficient information regarding these issues. An alternative way to report these problems is to have the user call in to customer support, navigate dial tone menus, wait for an operator, and explain to the operator the problem the user experienced, which the operator will subsequently log so that the issue may be manually addressed. In some cases, a provider may also or alternatively have self-service web pages that enable users to more directly report issues themselves. Chatbots and conversational chatbots are also gaining popularity to automate call center operation. In addition to such reactive user feedback, e.g., feedback received in reaction to an issue, a provider may conduct various surveys (i.e., periodically or on command) to track user experiences.

All these techniques require extensive user effort, which reduces the likelihood that users will provide sufficient feedback to fully enable the provider to identify and address service issues. Further, while service providers have full control over their client-side and server-side equipment, they do not have any control over the network equipment or operations. Similarly, network providers can control their own equipment and operations, but have no control over the service providers equipment or operations. This disconnect creates additional inefficiencies with QoE management.

Thus, there remains a need for improved and more automated QoE management for OTT services.

SUMMARY

The solution presented herein correlates per-session network logs with trouble reports provided by the users/user devices via a trouble reporting app to train ML models that are subsequently used to infer, explain, and address service issues. In so doing, the solution presented herein increases the level of automation for Quality of Experience (QoE) management, while simultaneously increasing the accuracy of such QoE management and improving a subscriber's experience with reporting and addressing network problems.

One exemplary embodiment comprises a method of managing a quality of experience for wireless services provided to a user device. The method is implemented by a network management system that is part of a wireless communication system configured to provide the wireless services to the user device. The method comprises receiving a trouble report from one or more user devices. Each received trouble report comprises user feedback data from a user of the corresponding device regarding quality of experience issues for an application service session associated with the user device, context information automatically collected by the user device for the application service session, and one or more identifiers associated with the user and/or the user device. For each received trouble report, the method further comprises correlating the trouble report with network data associated with the application service session for the corresponding user device to generate labeled training information. The labeled training information comprises multiple features extracted from the network data and labeled as incidents responsive to the user feedback data. The method further comprises training a Machine Learning (ML) model responsive to the labeled training information, and applying the trained machine learning model to the network data to infer service incidents for the one or more application service sessions. The method further comprises identifying one or more root causes for each inferred service incident responsive to the corresponding network data and the trained ML model.

One exemplary embodiment comprises a network management system for a wireless communication system configured to provide wireless services to a user device. The network management system is configured to manage a quality of experience associated with the wireless services provided to the user device. To that end, the network management system comprises one or more processing circuits configured to receive a trouble report from one or more user devices. Each received trouble report comprises user feedback data from a user of the corresponding device regarding quality of experience issues for an application service session associated with the user device, context information automatically collected by the user device for the application service session, and one or more identifiers associated with the user and/or the user device. For each received trouble report, the one or more processing circuits are further configured to correlate the trouble report with network data associated with the application service session for the corresponding user device to generate labeled training information. The labeled training information comprises multiple features extracted from the network data and labeled as incidents responsive to the user feedback data. The one or more processing circuits are further configured to train a Machine Learning (ML) model responsive to the labeled training information, and apply the trained machine learning model to the network data to infer service incidents for the one or more application service sessions. The one or more processing circuits are further configured to identify one or more root causes for each inferred service incident responsive to the corresponding network data and the trained ML model.

One exemplary embodiment comprises a method of facilitating quality of experience management. The method is implemented by a user device configured to receive wireless services via a wireless communication system. The method comprises executing an application service session on the user device. Responsive to one or more issues experienced during the execution of the application service session, the method comprises generating a trouble report comprising feedback data from a user of the user device regarding the issues experienced during the application service session, context information associated with the user device during the application service session and automatically collected by the user device for the wireless service session, and one or more identifiers associated with the user and/or the user device. The method further comprises sending the trouble report to a network management system of the wireless communication system to facilitate the quality of experience management associated with the application service session as performed by the network management system.

One exemplary embodiment comprises a user device in a wireless communication system configured to provide wireless services to the user device. The user device comprises one or more processing circuits configured to execute an application service session. Responsive to one or more issues experienced during the execution of the application service session, the one or more processing circuits are further configured to generate a trouble report comprising feedback data from a user of the user device regarding the issues experienced during the application service session, context information associated with the user device during the application service session and automatically collected by the user device for the wireless service session, and one or more identifiers associated with the user and/or the user device. The one or more processing circuits are further configured to send the trouble report to a network management system of the wireless communication system to facilitate a quality of experience management associated with the application service session as performed by the network management system.

DETAILED DESCRIPTION

Conventional solutions for managing a user's Quality of Experience (QoE) rely on the user to verbally relay problems via a customer support call line. Such verbal reporting efforts are very time consuming and inefficient due to the various steps users must take, e.g., navigating through lengthy dial tone menus, waiting for available operators, orally explaining the problem, etc. Therefore, many users will not even bother to report when they encounter service issues, e.g., their YouTube video stalls, or a web page does not load due to mobile network problems. Service providers are increasingly using self-service web pages and chatbots as cheaper and more efficient options for obtaining user feedback. However, these channels still require significant effort from the users. Also, user feedback orally provided to a customer service support center still requires that such feedback be manually entered, which increases the likelihood of error-prone and inconsistent data, making such data unsuitable for any type of automation for QoE management. Other options include the use of user experience surveys conducted by wireless providers. Because such surveys often occur long after the service incident(s) occurred and/or with insufficient frequency, such surveys typically only provide subjective snapshots of how the user feels about a service at the time of the survey. Due to limitations in human memory, it is not always possible to get sufficiently detailed or accurate information about individual user experience degradation incidents. Also, surveys necessarily do not allow for the implementation of automated systems capable of acting in real time in response to network issues.

The solution presented herein addresses these issues by providing an automated solution that improves QoE management for services provided to a user device, e.g., over-the-top (OTT) services. To that end, a user device according to the solution presented herein incorporates context data with user feedback data to generate a trouble report for an application service session (e.g., media streaming service). A network management system subsequently receives the trouble report (and potentially receives multiple trouble reports from multiple user devices), and uses the received trouble report(s) along with per-user, per-session network data collected for the same application service session to implement QoE management. As used herein, the user device may comprise any device capable of providing media services, including by not limited to, cellular telephones, laptop computers, smartphones, tablets, etc. Exemplary media services comprise any type of service provided to the user, and include, but are not limited to, streaming services, gaming, web browsing, audio and/or video communications, etc.

Figure 1:
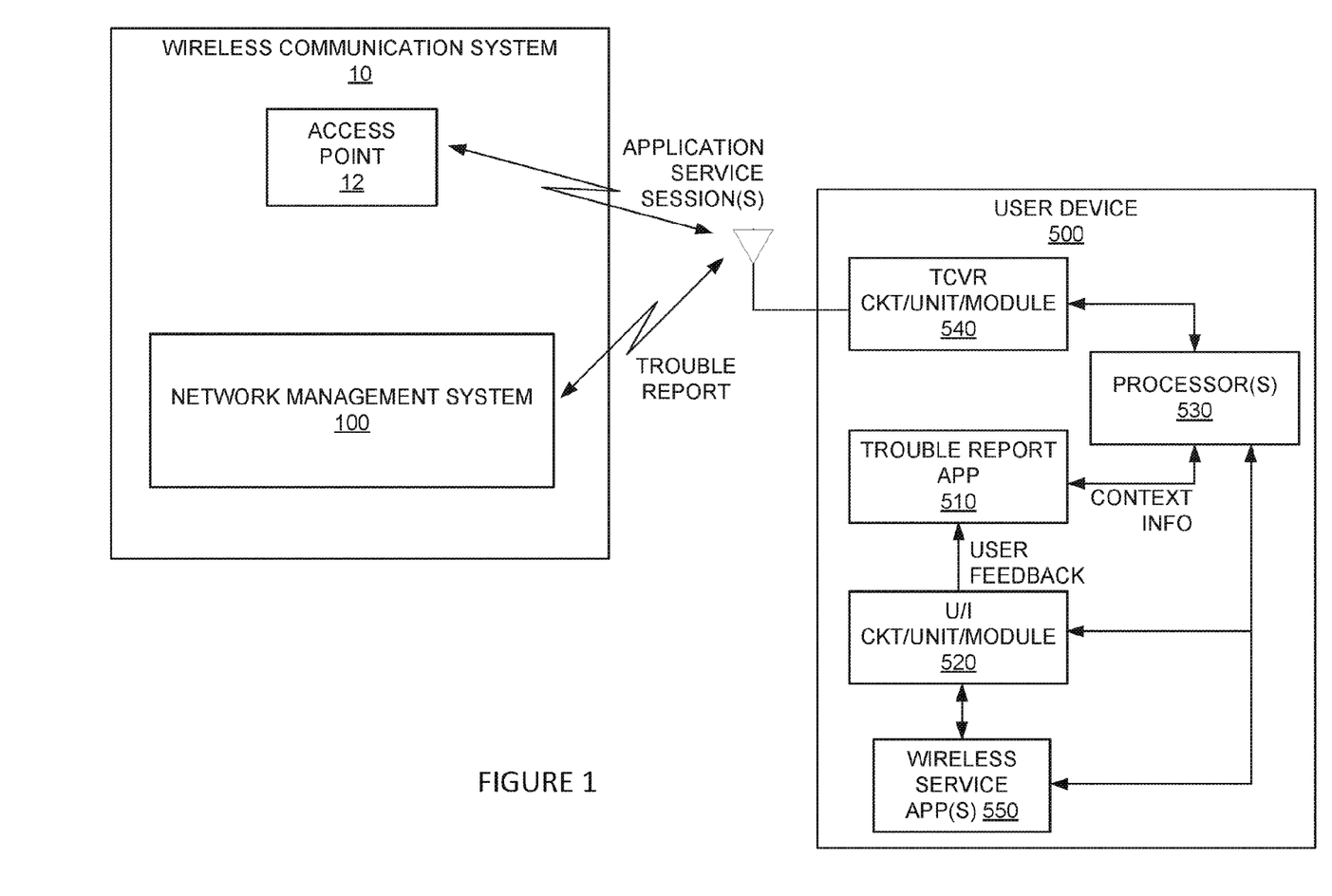
FIG. 1 shows a block diagram of a wireless communication system according to exemplary embodiments of the solution presented herein.

FIG. 1 shows an exemplary wireless communication system 10 providing wireless services to a user device 500. The wireless communication system 10 includes an access point 12, e.g., base station, NB, eNB, gNB, etc., configured to provide application services to the user device 500. Exemplary application services comprise those services typically associated with a specific application on the user device 500, e.g., YouTube, WhatsApp, Facebook, etc., and include any streaming of audio and/or video, communication services (e.g., voice and/or video calls or chats), gaming services, web browsing services, etc., to the user device 500. The wireless communication system 10 further includes a network management system 100, which in addition to being configured to manage many different aspects of the network operations, is also configured to manage the QoE of the application services provided by the wireless communication system 10 according to the solution presented herein. It will be appreciated that while the solution presented herein is described in terms of a wireless communication system and wireless application services, the solution presented herein also applies to wired communication systems that provide similar or the same application services via a wired interface.

Figure 2:
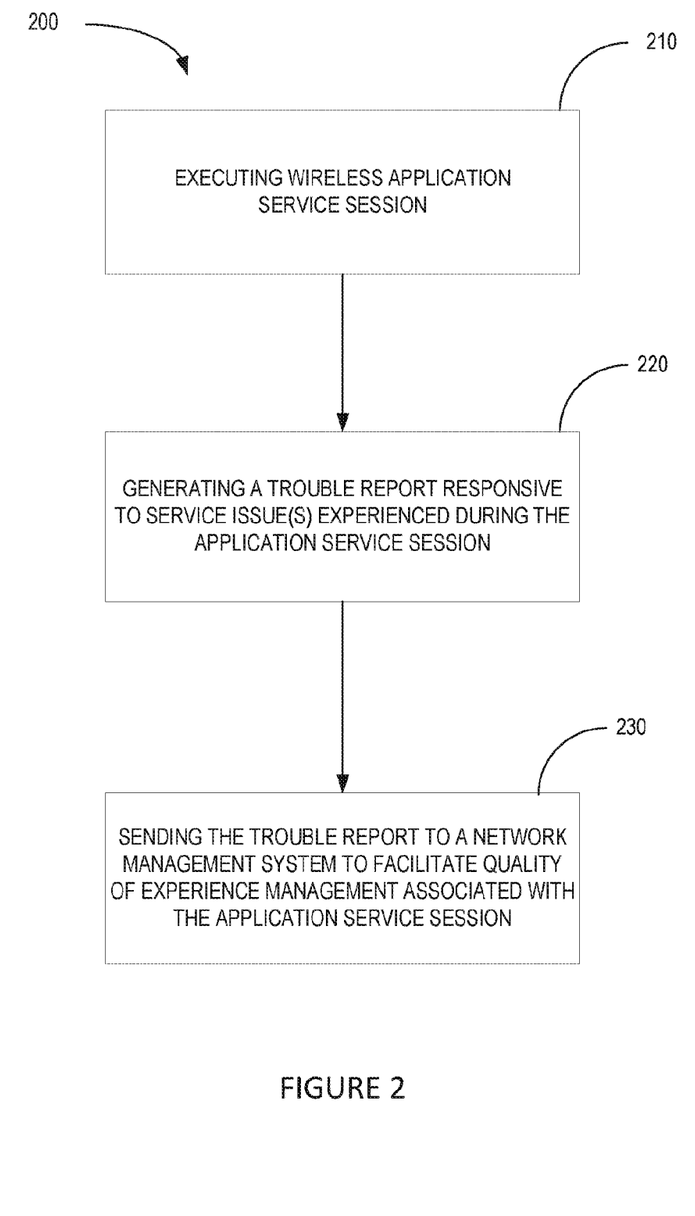
FIG. 2 shows a method implemented by a user device according to exemplary embodiments of the solution presented herein.

FIG. 2 shows a method 200 implemented by the user device 500 according to exemplary embodiments presented herein. The user device 500 executes an application service session via the wireless communication network 10 (block 210). Responsive to service issue(s) experienced during the application service session, the user device 500 generates a trouble report (block 220). The trouble report includes user feedback data from a user of the user device 500 regarding QoE issues for the application service session, context information automatically collected by the user device 500 for the application service session, and one or more identifiers associated with the user and/or the user device 500. The user device 500 then sends the trouble report to the network management system 100.

As noted herein, the user device 500 generates a trouble report responsive to user feedback, e.g., a textual description of the QoE issues experienced by the user of the user device 500 and/or one or more problem categories selected by the user of the user device 500 from a predefined list of problem categories provided to the user. Exemplary user feedback includes, but is not limited to, lost connection (e.g., at specified time during session or replay), distortion, incomplete download, slow connection, etc. In addition to the user feedback, the trouble report includes context information regarding the connection of the user device 500 to the wireless network 10, services provided by the wireless network 10 to the user device 500 during the application service session, and the status and usage of the user device 500. Exemplary context information includes, but is not limited to, a location of the user device 500 within the wireless network 10 during the application service session, network connectivity data associated with the application service session, identification information for one or more application programs operating on the user device 500 during the application service session and/or when the issue occurred, etc. By including the context information with the corresponding user feedback data, the solution presented herein improves the level of detail, and the accuracy of such detail, provided with respect to the issue being reported by the trouble report.

In exemplary embodiments, the user device 500 comprises a specific application for generating and sending the trouble reports, e.g., a trouble report application 510 as shown in FIG. 1, along with a user interface 520, one or more processors 530, and a transceiver 540. The processor(s) 530 control the operation of the user device 500, while the transceiver 540 receives wireless signals, including wireless signals for application service sessions, and transmits wireless signals, including the trouble reports. According to one exemplary embodiment, the trouble report application 510 is configured to receive, via user interface 520, the user feedback data to be included with the trouble report. It will be appreciated, however, that the solution presented herein is not limited to this implementation. In some exemplary embodiments, one or more apps on the user device 500 (e.g., part of processor(s) 530) may prompt for and/or receive the user feedback regarding service issues via the user interface 520, where the app then forwards this user feedback data to the trouble report app 510. In still other exemplary embodiments, the trouble report app 510 may receive user feedback data both from the app in question as well as directly from the user via user interface 520. In any event, the trouble report app 510 incorporates the user feedback data with the corresponding context information (e.g., received from the processing circuit(s) 530), and sends the trouble report to the network management system 100 via transceiver 540. The trouble report app 510 also includes an identifier associated with the user device 500, e.g., subscriber and/or device identifiers, with each generated trouble report. Exemplary identifiers include, but are not limited to, an International Mobile Equipment Identity (IMEI), Media Access Control (MAC) address, Mobile Identification Number (MIN), Subscriber Identification Module (SIM), International Mobile Subscriber Identification (IMSI), Mobile Subscriber Integrated Services Digital Network (MSISDN) number, etc. These identifiers enable the network management system 100 to associate each received trouble report with the corresponding user and/or user device 500s.

Figure 3:
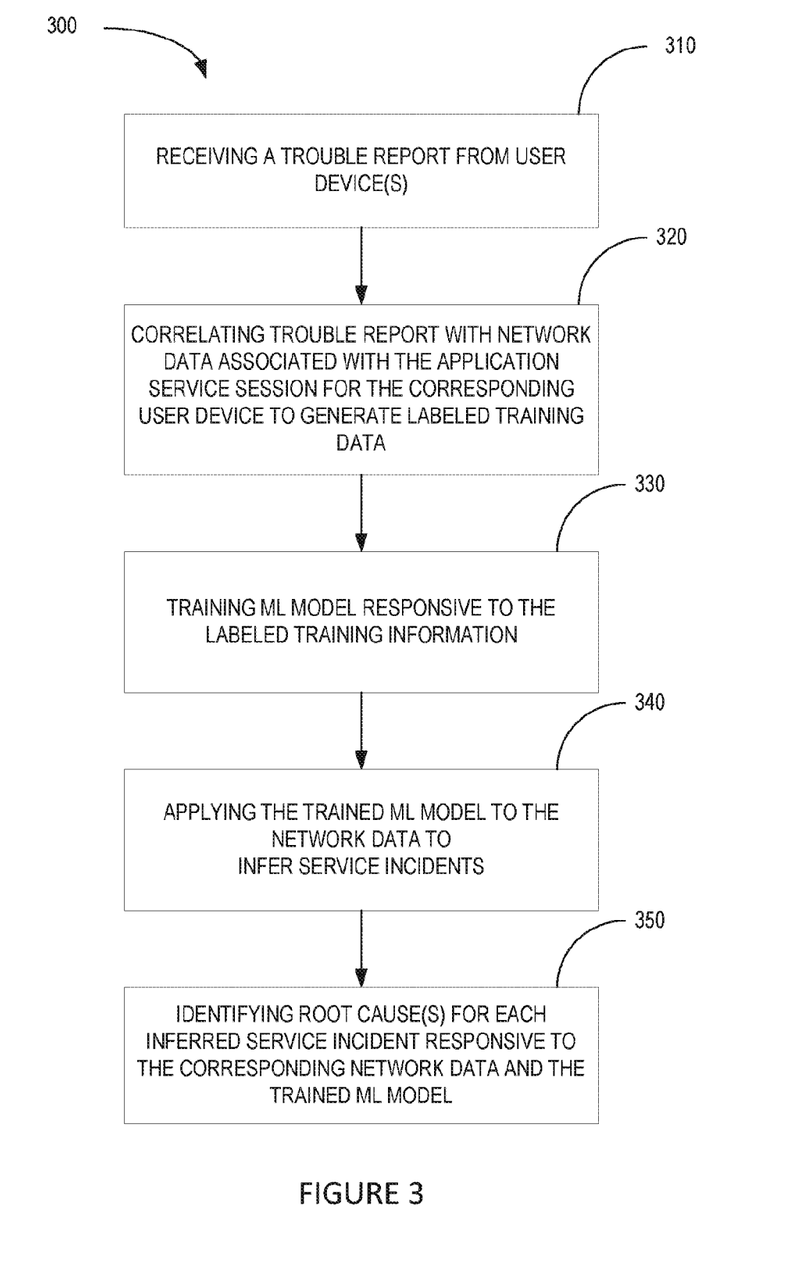
FIG. 3 shows a method implemented by a network management system according to exemplary embodiments of the solution presented herein.
Figure 4:
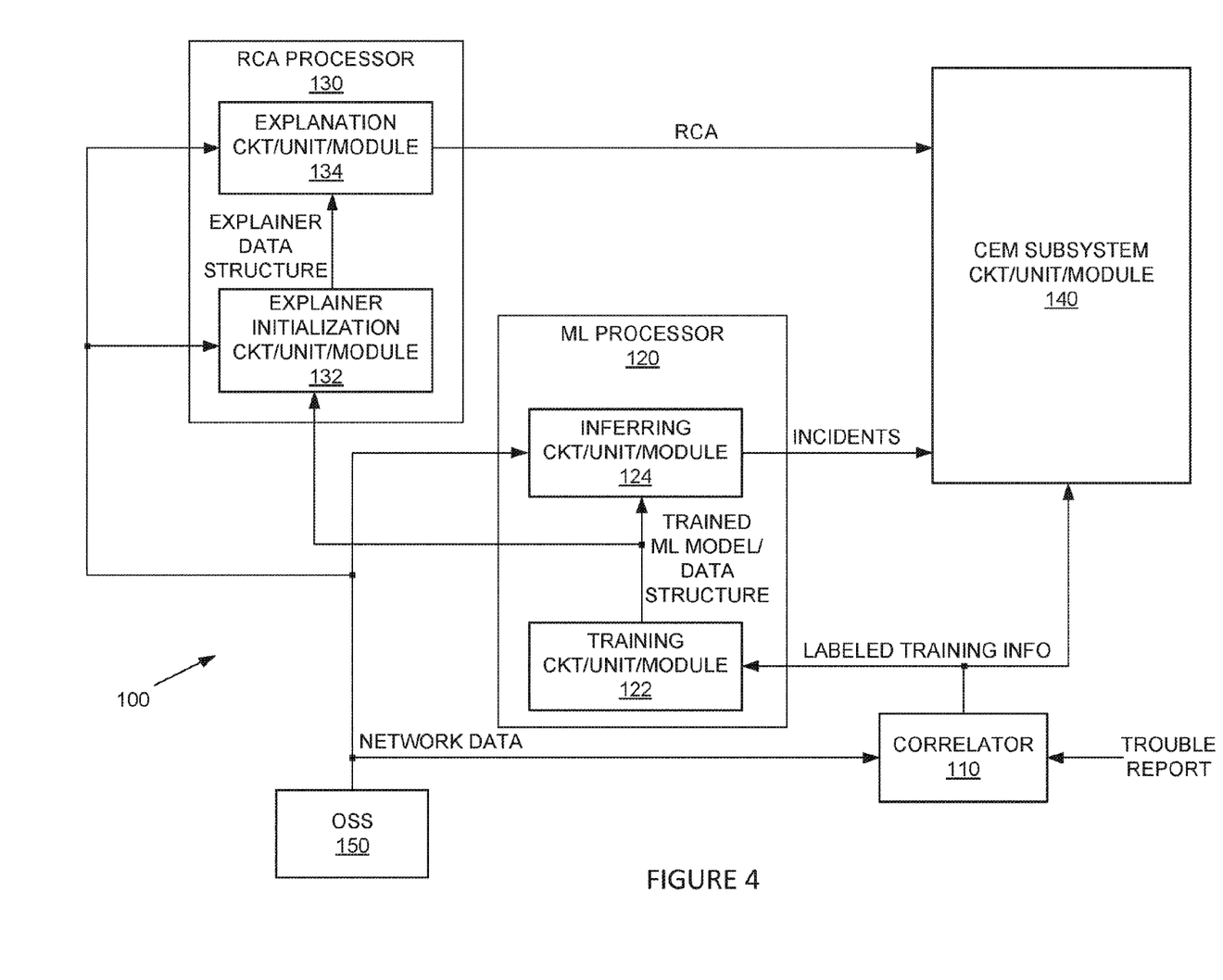
FIG. 4 shows a block diagram of a network management system according to exemplary embodiments of the solution presented herein.

FIG. 3 shows an exemplary method 300 implemented by the network management system 100, and FIG. 4 shows a block diagram of an exemplary network management system 100, which comprises a correlator 110, a Machine Learning (ML) processor 120, a Root Cause Analysis (RCA) processor 130, a Customer Experience Management (CEM) processor 140, and an Operations Support System (OSS) 150. The network management system 100 receives the trouble report(s) from one or more user devices 500 (block 310). Upon receipt, the correlator 110 correlates each trouble report with network data associated with the application service session for the corresponding user device 500, e.g., network data provided by the OSS 150, to generate labeled training data (block 320). The ML processor 120 trains a Machine Learning (ML) model responsive to the labeled training information (block 330), and applies the trained ML model to the network data obtained for the application service session to infer one or more service incidents (block 340). The RCA processor 130 identifies root cause(s) for each inferred service incident responsive to the corresponding network data and the trained ML model (block 350). The CEM processor 140 processes the identified root causes and the inferred service incidents to identify and address one or more network problems responsive to the identified service incidents and the identified one or more root causes.

As mentioned above, the correlator 110 correlates each received trouble report with the corresponding network data, e.g., as provided by the OSS 150. The network data includes various features associated with the wireless communication system 10 during execution of the application service session for a particular user. Such network data may be accumulated from multiple network domains, e.g., Radio Access Network (RAN) domains, core network domains, Internet protocol Multimedia Subsystem (IMS) domains, etc. Exemplary features include, but are not limited to, network configuration data and/or measurements for the wireless communication system 10 during execution of the application service session (e.g., signal strength, signal-to-noise ratios, signal-to-interference plus noise ratios, packet loss, frequency, session parameters, antenna parameters, etc.), performance metric(s) for signaling and/or a user plane at one or more layers of the wireless communication system 10, mobility-related event data during execution of the application service session (e.g., handover, handover parameters, handover results, etc.), communications configuration data for the communications implemented by the wireless communication system 10 during execution of the application service session (e.g., modulations and/or encodings used for the communications, etc.), etc. By correlating the network data with the corresponding trouble report, the correlator 110 generates labeled training information that labels extracted network data features as incidents responsive to the user feedback data. In some exemplary embodiments, the labeled training information links the user feedback data having a same identifier and a same time period as the user feedback data. Further, in some exemplary embodiments, the label for the labeled training information may comprise a Boolean variable marking a particular time slot within an application service session as a service incident, e.g., a service incident that happened at a given time (as identified by the user feedback data).

The ML processor 120 trains an ML model responsive to the labeled training information, and applies the trained ML model to the network data to infer service incidents for each application service session, which also serves to identify likely service incidents for users not directly having a trouble reporting app. To that end, the ML processor includes a training circuit 122 and an inferring circuit 124. The training circuit 122 trains the ML model responsive to the labeled training information to generate a trained ML model/data structure. The inferring circuit 124 applies the trained ML model to the network data to infer one or more service incidents for the corresponding application service session.

The trained ML model and the network data are also provided to the RCA processor 130, which comprises an explainer initialization circuit 132 and an explanation circuit 134 configured to perform the RCA. To that end, the explainer initialization circuit 132 generates an explanation data structure/model from the trained ML model and network data to generate a more refined model for root cause analysis, while the explanation circuit 134 uses the generated explanation model to identify one or more root causes for each identified service incident responsive to the network data.

The CEM subsystem processor 140 receives the service incidents from ML processor 120 and the root cause(s) from the RCA processor 130, and processes these inputs to quickly (e.g., in real time) identify and/or resolve network problems that are causing the various service incidents. More particularly, the OEM subsystem processor 140 uses the inferred service incidents to identify one or more network problems, uses the input root cause(s) to identify explanations and/or solutions for the network problems.

The CEM subsystem processor 140 may subsequently address any network problems using a variety of techniques. For example, CEM subsystem processor 140 may forward incident feedback information to a corresponding user device 500. Exemplary incident feedback information forwarded to the user device 500 includes, but is not limited to, an expected incident resolution time (i.e., the time the incident is expected to be resolved), an indication that the bad experience incident has been resolved, an indication of a network cause of the bad experience incident, an indication that the bad experience incident is not a network issue (and thus that the user should check their particular user device 500 or contact the OTT service provider for issues), etc. In other exemplary embodiments, the CEM subsystem processor 140 may alternatively or additionally be configured to forward incident feedback information to a Network Operations Center (NOC) to facilitate manual resolution of the one or more root causes, or may alternatively or additionally be configured to forward incident feedback information to a closed-loop system to facilitate automatic resolution of the one or more root causes. Exemplary incident feedback information forwarded to the network operations center and/or closed-loop system includes, but is not limited to, an identifier of the impacted subscriber and/or user device 500, service(s) impacted, an indication of one or more probably root causes (e.g., malfunctioning network element, bad configuration, overload, coverage problem, device issue, OTT issue), etc.

Figure 5:
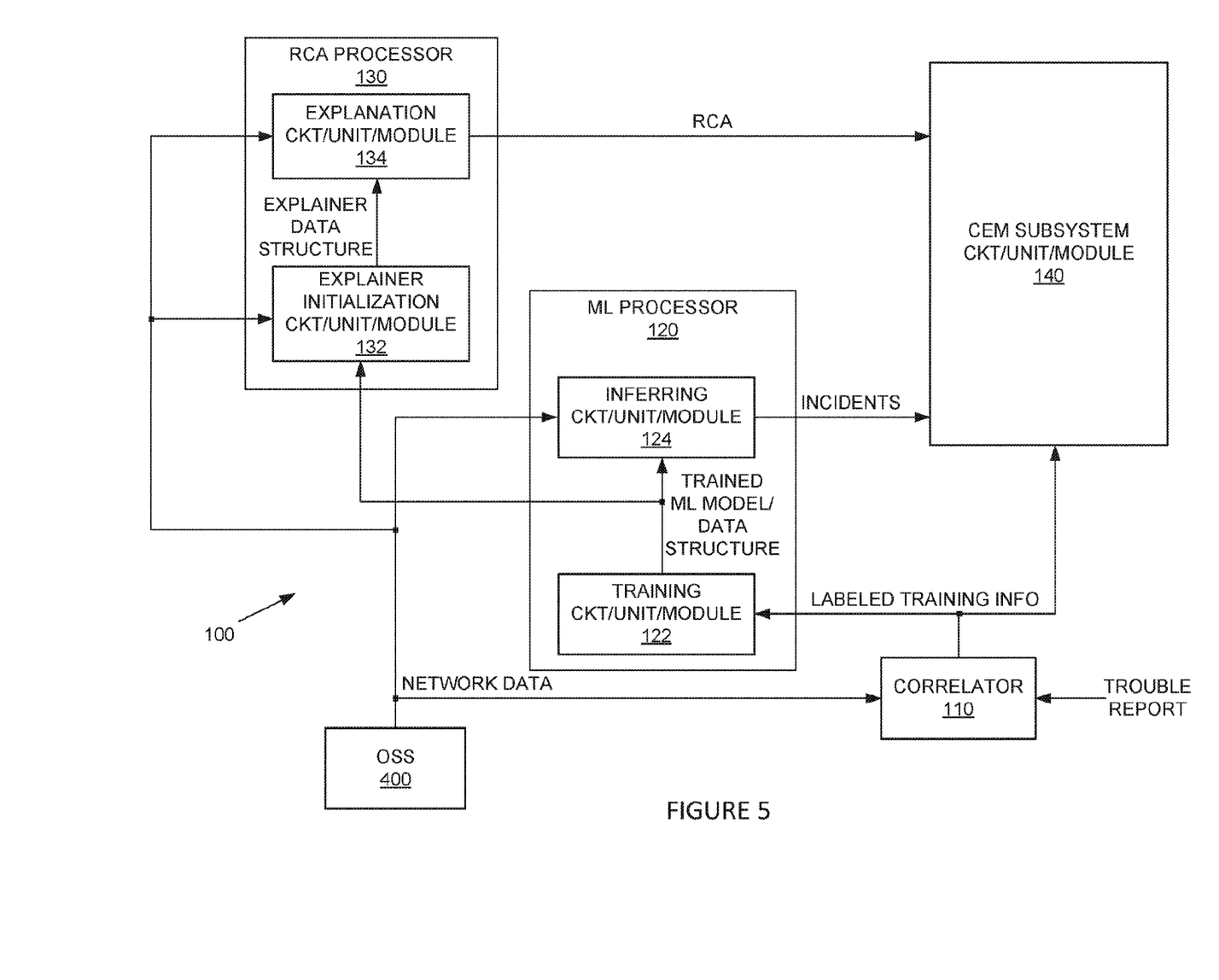
FIG. 5 shows a block diagram of another network management system according to exemplary embodiments of the solution presented herein.

The above describes the network management system 100 as including the OSS 150. In some exemplary embodiments, however, the OSS comprises an OSS 400 separate from the network management system 100, as shown in FIG. 5. In either case, the OSS 150, 400 provides the network data used by the network management system 100 as described herein.

The solution presented herein has several advantages over the orally-provided and/or survey-based conventional approaches. For example, the solution presented herein provides faster and easier network issue reporting, as well as faster diagnosis and recovery for subscribers using a particular app. The solution presented herein is also more detailed and more accurate due to the context information automatically collected by the user device 500 and incorporated with the trouble report. Further, the solution presented herein facilitates crowdsourcing labeled training data collection to subscribers for ML-based OEM operations, and thus improves the accuracy of the ML models used for CEM operations. In addition, because the solution presented herein helps resolve network issues experienced by more users than just those that report the issues, the real-time detection and RCA of network-related user experience incidents is useful for all subscribers, even those that do not have or utilize the trouble reporting app. Also, allowing (and motivating for) instant user feedback about network issues provides additional system advantages, e.g., the correlation of incident reports and detailed per-session network data can be performed in stream processing, which eliminates the need to store and archive large amounts of detailed network data for potentially longer periods of time.

Note that the apparatuses described herein may perform the methods herein, and any other processing, by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For example, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein. Thus, various apparatus elements disclosed herein, e.g., a network management system 100, trouble report app 510, U/I 520, processor 530, transceiver 540, correlator 110, ML processor 120, training circuit/unit/module 122, inferring circuit/unit/module 124, RCA processor 130, explainer initialization circuit/unit/module 132, explanation circuit/unit/module 134, CEM subsystem processor 140, etc., may implement any functional means, modules, units, or circuitry, and may be embodied in hardware and/or in software (including firmware, resident software, microcode, etc.) executed on a controller or processor, including an application specific integrated circuit (ASIC).

The present invention may be embodied as cellular communication systems, methods, and/or computer program products. Accordingly, the present invention may be embodied in hardware and/or in software (including firmware, resident software, micro-code, etc.), including an application specific integrated circuit (ASIC). Furthermore, the present invention may take the form of a computer program product on a computer-usable or computer-readable storage medium having computer usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, or a portable compact disc read-only memory (CD-ROM). Note that the computer-usable or computer-readable medium could even be paper or another suitable medium upon which the program is printed, as the program can be electronically captured via, for example, optical scanning or the paper or other medium, then compiled, interpreted, or otherwise processed in a suitable manner, if necessary, and then stored in a computer memory.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of managing a quality of experience for wireless services provided to a user device, the method being implemented by a network management system that is part of a wireless communication system configured to provide the wireless services to the user device, the method comprising:
   receiving a trouble report from one or more user devices, each received trouble report comprising:
      user feedback data from a user of the corresponding user device regarding quality of experience issues for an application service session associated with the user device;
      context information automatically collected by the user device for the application service session; and
      one or more identifiers associated with the user and/or the user device;
   for each received trouble report, correlating the trouble report with network data associated with the application service session for the corresponding user device to generate labeled training information, said labeled training information comprising multiple features extracted from the network data and labeled as incidents responsive to the user feedback data;
   training a Machine Learning (ML) model responsive to the labeled training information;
   applying the trained ML model to the network data to infer service incidents for the one or more application service sessions; and
   identifying one or more root causes for each inferred service incident responsive to the corresponding network data and the trained ML model.

2. The method of claim 1, wherein the context information comprises at least one of:
   a location of the corresponding user device during the application service session;
   network connectivity data associated with the application service session; and
   identification information for one or more application programs operational on the user device during the application service session.

3. The method of claim 1, wherein the user feedback data comprises at least one of:
   a textual description of the quality of experience issues experienced by the user of the corresponding user device; and
   one or more problem categories selected by the user of the corresponding user device from a predefined list of problem categories.

4. The method of claim 1, wherein the one or more features comprise one or more of:
   communication configuration data;
   one or more performance metrics for signaling and/or a user plane at one or more layers of the wireless communication system;
   mobility-related event data; and
   network configuration data.

5. The method of claim 1, wherein correlating the trouble report with the network data comprises linking the user feedback data to the network data having a same identifier and a same time period as the user feedback data.

6. The method of claim 1, wherein:
   the network management system comprises a customer experience management subsystem; and
   the method further comprises identifying and addressing, by the customer experience management subsystem, one or more network problems responsive to the inferred service incidents and the identified one or more root causes.

7. The method of claim 1, further comprising obtaining the network data from an operational support system operatively connected to or part of the network management system.

8. The method of claim 1, wherein:
   the network management system comprises a Root Cause Analysis (RCA) processor; and
   identifying the one or more root causes comprises identifying, by the RCA processor, the one or more root causes for each identified service incident responsive to the corresponding network data and the trained ML model.

9. A network management system for a wireless communication system configured to provide wireless services to a user device, said network management system configured to manage a quality of experience associated with the wireless services provided to the user device, said network management system comprising:
   one or more processing circuits configured to:
      receive a trouble report from one or more user devices, each received trouble report comprising:

user feedback data from a user of the corresponding user device regarding quality of experience issues for an application service session associated with the user device;

context information automatically collected by the user device for the application service session; and one or more identifiers associated with the user and/or the user device;

for each received trouble report, correlate the trouble report with network data associated with the application service session for the corresponding user device to generate labeled training information, the labeled training information comprising multiple features extracted from the network data and labeled as incidents responsive to the user feedback data;

train a Machine Learning (ML) model responsive to the labeled training information;

apply the trained ML model to the network data to infer service incidents for the one or more application service sessions; and identify one or more root causes for each inferred service incident responsive to the corresponding network data and the trained ML model.

10. The network management system of claim 9, wherein the context information comprises at least one of:

a location of the corresponding user device during the application service session;

network connectivity data associated with the application service session; and identification information for one or more application programs operational on the user device during the application service session.

11. The network management system of claim 9, wherein the user feedback data comprises at least one of:

a textual description of the quality of experience issues experienced by the user of the corresponding user device; and one or more problem categories selected by the user of the corresponding user device from a predefined list of problem categories.

12. The network management system of claim 9, wherein the one or more features comprise one or more of:

communication configuration data;

one or more performance metrics for signaling and/or a user plane at one or more layers of the wireless communication system;

mobility-related event data; and network configuration data.

13. The network management system of claim 9, wherein to correlate the trouble report with the network data the one or more processing circuits are configured to link the user feedback data to the network data having a same identifier and a same time period as the user feedback data.

14. The network management system of claim 9, further comprising a customer experience management subsystem configured to identify and address one or more network problems responsive to the inferred service incidents and the identified one or more root causes.

15. The network management system of claim 9, wherein the one or more processing circuits are further configured to obtain the network data from an operational support system operatively connected to or part of the network management system.

16. The network management system of claim 9, further comprising a Root Cause Analysis (RCA) processor, wherein to identify the one or more root causes the one or more processing circuits are configured to use the RCA processor to identify the one or more root causes for each identified service incident responsive to the corresponding network data and the trained ML model.

17. A method of facilitating quality of experience management, the method implemented by a user device configured to receive wireless services via a wireless communication system, the method comprising:

executing an application service session on the user device;

responsive to one or more issues experienced during the execution of the application service session, generating a trouble report comprising:

feedback data from a user of the user device regarding the issues experienced during the application service session;

context information associated with the user device during the application service session and automatically collected by the user device for the application service session; and one or more identifiers associated with the user and/or the user device; and sending the trouble report to a network management system of the wireless communication system to facilitate the quality of experience management associated with the application service session as performed by the network management system.

18. The method of claim 17, wherein:

the context information comprises at least one of:

a location of the corresponding user device during the application service session;

network connectivity data associated with the application service session; and identification information for one or more application programs operational during the application service session; and/or the user feedback data comprises at least one of:

a textual description of the quality of experience issues experienced by the user of the corresponding user device; and one or more problem categories selected by the user of the corresponding user device from a predefined list of problem categories.

19. The method of claim 17, further comprising receiving incident feedback information from the network management system responsive to the trouble report, wherein the incident feedback information comprises at least one of an expected resolution time, an indication of resolution of the experienced issue, and an indication of a cause of the experienced issue.

20. A user device in a wireless communication system configured to provide wireless services to the user device, said user device comprising:

one or more processing circuits configured to:

execute an application service session on the user device;

responsive to one or more issues experienced during the execution of the application service session, generate a trouble report comprising:

feedback data from a user of the user device regarding the issues experienced during the application service session;

context information associated with the user device during the application service session and automatically collected by the user device for the application service session; and one or more identifiers associated with the user and/or the user device; and send the trouble report to a network management system of the wireless communication system to facilitate quality of experience management associated with the application service session as performed by the network management system.

* * * * *